W. E. BOCK.
CAGE FOR ROLLER BEARINGS.
APPLICATION FILED JUNE 20, 1914.
1,200,458.
Patented Oct. 10, 1916.
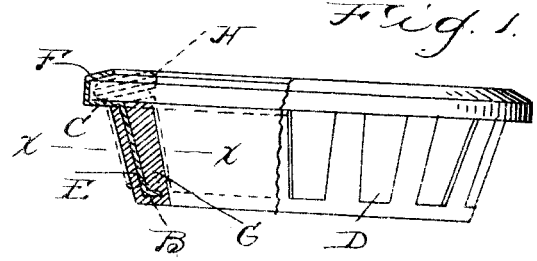
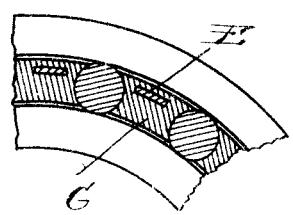
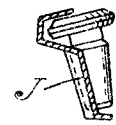
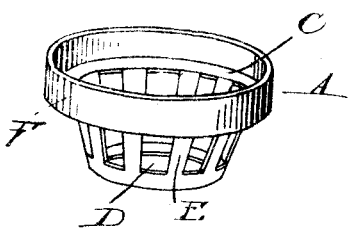
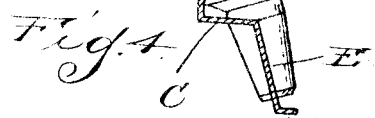
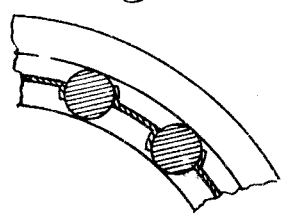
WITNESSES:
W. K. Ford
James P. Barry
INVENTOR
William E. Bock
BY
Whittemore, Hulbert & Whittemore
ATTORNEYS

UNITED STATES PATENT OFFICE.

WILLIAM EMIL BOCK, OF TOLEDO, OHIO, ASSIGNOR TO THE BOCK COMPANY, A CORPORATION OF OHIO, (INCORPORATED IN OHIO IN MARCH, 1916.)

CAGE FOR ROLLER-BEARINGS.

1,200,458.    Specification of Letters Patent.    Patented Oct. 10, 1916.

Application filed June 20, 1914. Serial No. 846,302.

*To all whom it may concern:*

Be it known that I, WILLIAM E. BOCK, a citizen of the United States of America, residing at Toledo, in the county of Lucas and State of Ohio, have invented certain new and useful Improvements in Cages for Roller-Bearings, of which the following is a specification, reference being had therein to the accompanying drawings.

The invention relates to roller bearings and more particularly to the cage or spacer for positioning the rolls and holding the same in proper alinement.

It is one of the objects of the invention to obtain a construction in which the rolls are retained by a flange projecting laterally from the spacer portion of the cage and bent or spun over the ends of the rolls to hold them from endwise displacement.

It is a further object to form the spacing bearings for the rolls of die cast metal, while the retainer which holds the rolls from displacement is formed of sheet metal; and still further, it is an object to strengthen or reinforce the die casting by embedding in the same a core of stronger material, such as a sheet metal stamping.

In the drawings: I have illustrated a construction designed for use in connection with a bearing having conical rolls, but it is obvious that the invention is applicable to other types of bearing.

Figure 1 is a cross section through the cage showing one of the rolls in dotted lines; Fig. 2 is a section on line x—x Fig. 1; Fig. 3 is a perspective view of the sheet metal stamping forming the reinforcement; Fig. 4 is a section showing the manner of spinning over the sheet metal flange of the cage to form the retainer for the rolls; Fig. 5 is a section similar to Fig. 4 showing a modified construction; and Fig. 6 illustrates a detail of construction.

My improved cage is applicable to that type of roller bearings which are designed for taking care of both radial and end thrust, and in which the end thrust is transmitted to enlarged heads upon the rolls. It is desirable to hold the rolls in proper spaced relation, and for this purpose the construction is provided with spacer bearings, while the rolls are held from endwise displacement by a bent flange engaging the enlarged heads.

With the construction shown in Figs. 1 and 2, the spacer portion of the cage is formed of an integral die casting having a series of spacer bearings with concave faces for receiving the respective rolls. To strengthen this die casting it is reinforced by an embedded core, preferably a sheet steel stamping, and the retaining flange for the rolls is preferably formed integral with this core.

In detail, A is the reinforcement or core, which is preferably formed of a sheet metal stamping. As shown, this is of conical form and is provided with an inwardly-turned annular flange B at its smaller end, and an outwardly-turned annular flange C at its large end. Intermediate these flanges the conical portion is cut away at D to form a series of spokes E which are of lesser width than the space between adjacent rolls of the bearing. Beyond the flange C is a cylindrical portion F, which, after the rolls are in place, is spun down to form a retainer.

The core or reinforcement A formed as described is placed in the die in which the cast is formed, so that the spokes E extend centrally between the cores that form the roll recesses. The metal is then cast in the die and surrounds the spokes E, as shown at G in Fig. 2, forming segmental bearings for engaging the rolls. The cast metal also extends downward below the flange B to completely embed the same, but at the upper end the cast metal preferably terminates in the plane of the flange C. Thus a series of open conical pockets are formed between the bearings G for the reception of the conical rolls, while the enlarged heads of said rolls, indicated at H, and which take the end thrust, overlap said flange C.

In assembling the bearing, the rolls are first placed in the pockets or recesses between the bearings G, after which the cylindrical flange F is spun over as indicated at I in Fig. 4, thereby forming a retainer which prevents the endwise disengagement of the rolls. The strength imparted to the structure by the sheet metal reinforcement is sufficient to withstand any ordinary stress, such as produced by the accidental dropping of the cage, without either breakage or deformation. Thus a thoroughly practical construction is obtained and one which possesses peculiar advantages.

In the modified construction shown in Fig. 5, in place of forming the spacer portions of the cage of die casting they are formed by bent lugs J formed integral with the sheet metal stamping, while the retaining flange is formed similar to the construction shown in Fig. 4.

What I claim as my invention is:—

1. A cage for roller bearings, comprising a die casting forming the spaced bearings for the rolls, and a bendable sheet metal flange anchored in said die casting and extending outward therefrom and forming a retainer against end displacement.

2. A cage for roller bearings, comprising a die casting forming the spaced bearings for the rolls and a stamping embedded in said casting having spoke portions surrounded by said spacing bearings, and a projecting, bendable flange forming a retainer from endwise displacement.

3. A cage for roller bearings, comprising a die casting and a sheet metal stamping forming a reinforcement for said casting, said stamping being provided with annular flanges at its opposite ends, and intermediate spoke portions surrounded by the cast metal, one of said annular flanges also being surrounded by the cast metal.

4. A cage for roller bearings, comprising a die casting and a sheet metal stamping forming a reinforcement provided with annular flanges at opposite ends, and intermediate spokes, one of said flanges and said spokes being embedded in the cast metal, and the other of said flanges projecting to form a bendable retainer.

5. A cage for roller bearings, comprising a die casting and a reinforcement formed of a sheet metal stamping provided with annular flanges at its opposite ends, and intermediate spokes, said flanges and spokes being in transverse planes, one of said flanges and said spokes being embedded in the cast metal and the other flange extending outward beyond the casting, and a cylindrical flange extending from said outwardly-projecting flange adapted to be spun over the ends of the rolls to form a retainer therefor.

6. A cage for roller bearings, comprising a portion forming spacer bearings for the rolls, and a bendable flange portion adapted to embrace the heads of the rolls and to be spun over the same to prevent endwise displacement.

7. A cage for roller bearings, comprising a casting, and a sheet metal stamping embedded in said casting having a portion removably forming a retainer against end displacement.

8. A cage for roller bearings, comprising a die casting forming the spaced bearings for the rolls, and a stamping embedded in said casting having integral spoke portions surrounded by said spaced bearings.

9. A cage for roller bearings, comprising a portion forming spacer bearings for the rolls, and a member having an outwardly and an inwardly extending portion embracing the heads of said rolls to form a retainer for the rolls against end displacement.

10. A cage for bearings, comprising a casting and a sheet metal stamping embedded in said casting, said stamping having portions thereof struck out to form pockets for the rolls, the struck-out portions being fashioned to form oppositely-extending segmental bearings for the rolls.

11. A cage for roller bearings, comprising a die casting having a positively embedded reinforcement.

12. A cage for roller bearings, comprising a casting, and a sheet metal stamping partially surrounded by and rigidly embedded in the cast metal, forming a reinforcement.

13. A cage for bearings comprising a casting and the stamping embedded in said casting, said stamping having portions thereof struck out to form pockets for the rolls, the struck out portions forming bearings for said rolls.

In testimony whereof I affix my signature in presence of two witnesses.

WILLIAM EMIL BOCK.

Witnesses:
JAMES P. BARRY,
ARTHUR D. PULVER.

It is hereby certified that the assignee in Letters Patent No. 1,200,458, granted October 10, 1916, upon the application of William Emil Bock, of Toledo, Ohio, for an improvement in "Cages for Roller-Bearings," was erroneously described and specified as "The Bock Company," whereas said assignee should have been described and specified as *The Bock Bearing Company*, as shown by the records of assignments in this office; and that the said Letters Patent should be read with this correction therein that the same may conform to the record of the case in the Patent Office.

Signed and sealed this 22d day of October, A. D., 1918.

[SEAL.]

R. F. WHITEHEAD,
*Acting Commissioner of Patents.*

Cl 64—62.